United States Patent Office 3,008,840
Patented Nov. 14, 1961

3,008,840
PROCESS FOR STABILIZING DAIRY PRODUCTS AGAINST AGE-THICKENING
Aubrey P. Stewart, Jr., Chicago, Ill., and Robert A. Johnson, San Jose, and Patricia T. Anderson, San Mateo, Calif., assignors, by mesne assignments, to Hawthorn-Mellody, Inc., Chicago, Ill., a corporation of Delaware
No Drawing. Continuation of application Ser. No. 484,583, Jan. 27, 1955. This application Oct. 22, 1958, Ser. No. 768,860
17 Claims. (Cl. 99—212)

This invention relates to a new and improved process for preparing sterilized dairy products, including whole and skimmed milk, evaporated milk, cream, and sterile concentrated milk, which has a concentration greater or less than that normally existing in commercial evaporated milk. More particularly, this invention relates to a method for treating dairy products, such as evaporated or concentrated milk, after the same have been subjected to high-temperature, short-time sterilization, to prevent subsequent in-the-can gelation, or age-thickening, or to defer such gelation to a time beyond the time span within which such products will have been normally consumed.

This application is a continuation of our copending application Serial No. 484,583, filed January 27, 1955, and now abandoned.

For many years it has been conventional practice to produce canned, sterilized milk, evaporated milk, cream, and other dairy products by first sealing the product in the can and then heating the sealed can and contents in a retort under steam pressure. Although the cans were usually rotated or shaken during the heating period, for the most part the time and temperature conditions required to achieve sterilization were such that the resultant milk product had a strong "cooked" flavor and a brown color. Typical time and temperature conditions for the sterilization of milk and evaporated milk by the agitation-retort process are as follows: about 15 to 20 minutes to raise the temperature to 240° F.; about 15 minutes to sterilize the milk at 240° F. to 245° F.; and about 10 to 15 minutes to cool the milk to 70° to 80° F. Milk, cream and evaporated milk products sterilized by the above method, although possessing a strong cooked flavor and brown color, are substantially free from the tendency to age-thicken or gel.

In order to overcome the objectionable cooked flavor and brown color characteristics of products sterilized according to such conventional practice, efforts have been made to employ what is known as high-temperature, short-time sterilization. It is well known that, by employing high temperatures and short holding times for sterilization, cooked flavor and brown color can be greatly minimized. In the past few years equipment has been developed which produces better agitation of the product sealed in the can and therefore enables a faster and more uniform transfer of heat to the product. Such equipment enables "in the can" sterilization to be conducted at a temperature of about 260° F. to 265° F. with a holding time of 5 minutes or less. Another recent development is a method of canning known as aseptic canning. This method enables the product to be pumped through high velocity heaters which sterilize the milk at temperatures of 265° F. to 300° F. with holding times in the range of a few minutes to a few seconds. The sterilized milk is then quickly cooled in a previously sterilized cooler, aseptically canned by filling into previously sterilized cans, and sealed with previously sterilized lids.

Although high-temperature, short-time sterilization minimizes the degree of cooked flavor and brown color imparted to the product, many dairy products sterilized under these conditions have a tendency to age-thicken. This tendency is particularly marked in the case of evaporated milk where objectionable age-thickening occurs within a storage period of three to six months. Whole milk and cream will frequently exhibit objectionable age-thickening in nine months to one year.

With the process of the subject invention, evaporated milk can be produced within a minimum of cooked flavor and brown color while being resistive to age-thickening over a period of more than six months. In like manner, whole milk and cream, when treated in accordance with the steps of the subject process, will have their periods of resistance to age-thickening materially enhanced.

This invention is based upon the discovery that the tendency toward age-thickening can be minimized by adjusting the salt balance of the product after high-temperature, short-time sterilization and prior to storage. An essential object of the invention is to provide a method for treating evaporated milk, and the like, after the same has been subjected to high-temperature, short-time sterilization, to prevent or hinder age-thickening during storage. A further object of the invention is to provide a method for treating evaporated milk, and the like, after the same has been subjected to high-temperature, short-time sterilization, to both prevent or hinder age-thickening and undesirable insoluble salt precipitation during storage.

In carrying out this invention, as applied to evaporated milk, it is first desirable to prepare a concentrated milk which is stable toward sterilization heat treatment. While at certain seasons of the year it is possible to merely pasteurize and evaporate the milk to obtain a concentrate which will not heat coagulate during sterilization, most of the time special measures must be taken to stabilize the concentrate or else coagulation will occur during sterilization. This stabilization may be accomplished in several known ways, including the following: by the addition of small amounts of disodium phosphate or sodium citrate; by forewarming the milk prior to evaporation or forewarming the concentrate after evaporation but prior to sterilization; by utilizing ion-exchange treatment of the concentrate prior to sterilization.

The method of adjustment of salt balance after sterilization, according to our invention, will depend, to a certain extent, on the manner in which the concentrate was prepared prior to sterilization as well as the sterilization temperature and time employed. However, we have discovered that in order to minimize age-thickening, it is necessary to increase the concentration of divalent cations, $Ca^{++}$ or $Mg^{++}$, or decrease the concentration of monovalent cations, $Na^+$ or $K^+$. Furthermore, we have discovered that this must be done in such a manner as not to cause later, during storage, the precipitation of insoluble calcium or magnesium salts in the form of unsightly and objectionable crystals. One manner of accomplishing both of these ends is to employ sterile ion-exchange treatment after the concentrate itself has been sterilized.

It should be understood that it is not practical to increase the $Ca^{++}$ or $Mg^{++}$ ion concentration prior to sterilization since these cations greatly de-stabilize the concentrate in relation to ability of the concentrate to be high-temperature, short-time sterilized without heat coagulation. Similarly, decreasing the $Na^+$ or $K^+$ ion concentration prior to sterilization renders the concentrate unshtable to heat. By utilizing our discovery, the age-thickening may be prevented or inhibited by adjusting the salt balance of the concentrate after sterilization, we are able to eliminate the problems connected with the prevention of heat coagulation during sterilization.

In practice, we have prepared high-temperature, short-time sterilized evaporated milk, with a storage stability of more than six months, by the following procedure, by way of example: whole milk was forewarmed to a temperature of 180° F. for 20 minutes and then evaporated under vacuum to a solids content of 28 percent. To this concentrate there was added a small amount of 30% fat cream and water to give a final composition of 26% total solids of which 8.0% was butterfat. This concentrate was then sterilized by passage through a high velocity heater, which raised the temperature to 275° F., and through a holding tube which gave a 37 seconds holding time. The sterilized concentrate was then passed through a previously sterilized pre-cooler and homogenized at a temperature of 140° F. Following sterile homogenization, the product was cooled to 80° F. and filled into previously sterilized cans containing previously sterilized ion-exchange material. The filled cans were then sealed with previously sterilized lids.

The ion-exchange material used in this example was prepared as follows: Chempro C–20, a strong acid cation polystyrene resin exchanger, was received in the sodium state from the manufacturer thereof, the Chemical Process Company of Redwood City, California. To be assured of reactivation, the resin was first acid regenerated by the addition of 10 volumes of 5% hydrochloric acid to one volume of wet, tamped resin. The mixture was held for 5 minutes with stirring and decanted. The resin was again treated with 10 volumes of 5% hydrochloric acid, held for 5 minutes with stirring and decanted. The resin was then treated with 10 volumes of 15% hydrochloric acid, the mixture held for 5 minutes with stirring, and then decanted. The resin was washed with previously boiled distilled water until no acid was noted in the wash water by litmus paper test.

The previously acid treated resin was then regenerated to the sodium form by adding 10 volumes of 10% sodium chloride solution to one volume of wet, tamped resin, the mixture held 5 minutes with stirring, and decanted. The resin was again treated with 10 volumes of 10% sodium chloride solution, held 5 minutes with stirring, and decanted. The resin was then washed with previously boiled distilled water until no salt taste was noted in the wash water.

After being washed free of excess sodium chloride, the resin was then put through a cycle of mixed calcium-sodium regeneration, accomplished by treating each 100 ml. (tamped volume) of the sodium-regenerated resin with 15.1 grams of anhydrous calcium chloride dissolved in 100 ml. of distilled water. The mixture was held 5 minutes with stirring, decanted, washed with distilled water, dried, and sterilized. This resin was then used in treatment of the sterilized evaporated milk in the amount of approximately 0.4% by weight.

The particular technique of using a mixed calcium-sodium regenerated resin is desirable for operational convenience, since it was found that this type of resin bed would not coagulate the evaporated milk contacting the resin or produce a slime which would make a continuous flow column unusable after a short period of operation. However, with special precaution, it is possible to accomplish the desired results of salt balance adjustment by a number of procedures. Among these procedures which we have found to be effective in various degrees are: use of a conventional column type ion-exchange process; use of a modified column type and employing backwash techniques; and ion-exchange treatment of a portion of the sterilized evaporated milk followed by a metering of this portion back into the main stream.

Among the resins used were Chempro C–20 and Duolite CS–101 for cation-exchange, and Duolite A–4 and Duolite A–30 for an ion exchange. These resins were all produced by the Chemical Process Company of Redwood City, California.

Although the chemistry of salt balance adjustment after sterilization is not definitely known in relation to inhibiting age-thickening, or gelation, it is thought that the inhibiting effect is caused by proper addition of divalent cations, represented by $Ca^{++}$ and $Mg^{++}$, in such a manner as to react with the proteins and yet not form insoluble calcium phosphate and/or calcium citrate. It is also our discovery that the most effective salt balance adjustment of evaporated milk after sterilization is one which also partially removes monovalent ions, represented by $Na^+$ and $K^+$. Thus, in the example given, not only is $Ca^{++}$ added, but also the ion-exchange treatment serves to remove $Na^+$ and $K^+$ from the evaporated milk.

It is to be understood that the ion-exchange treatment and salt balance adjustment above-described, which is effective to minimize age-thickening, is not the type of salt balance adjustment described in the literature for stabilizing evaporated milk to heat coagulation. In fact, the subject salt balance adjustment is opposite in nature, since in adjusting the salt balance to stabilize against heat coagulation the practice is to add $Na^+$ (e.g. sodium citrate or sodium phosphate) or remove $Ca^{++}$.

If a given concentrate has been stabilized against heat coagulation prior to sterilization by way of addition of sodium citrate or sodium phosphate, it is advisable, according to the subject process, to utilize an amount of ion-exchange material in excess of normal after sterilization to remove a sufficient amount of the added $Na^+$ to prevent or hinder age-thickening.

Also, we have found that a sterile solution of calcium chloride may be added to evaporated milk, after sterilization and prior to storage, to prevent or hinder age-thickening. However, while the addition of calcium ions in this manner effectively hindered age-thickening, there was a precipitation of insoluble calcium salts in the milk on storage. Such precipitation results in down-grading of the commercial product, although the product is still salable. The method of the present invention is to so add calcium ion, such as in the preferred way above disclosed, to prevent such precipitation.

It is our intention, by placing the ion-exchange material in the can prior to filling with sterile evaporated milk, to simulate a possibly ideal condition wherein the ion-exchange material may be included in the resin lining of the can, as manufactured.

Within the concept and scope of our invention is ion-exchange treatment of evaporated milk which is high-temperature, short-time sterilized by "in the can" sterilization equipment. Thus, the ion-exchange material in the can may be coated with a substance which prevents the aforementioned undesirable salt balance adjustment prior and during sterilization, but which dissolves to allow the salt balance adjustment to take place after sterilization in order to minimize age-thickening. Preparation of the can liner in such a manner as to allow the salt balance adjustment reaction to take place very slowly, so that the major portion of the reaction occurs after sterilization, would permit the elimination of the slowly dissolvable protective coating over the ion-exchange material.

It has been found that the lower the temperature and the longer the holding time used in sterilization, the less the extent of salt balance adjustment required after sterilization. However, our invention is applicable where the sterilization conditions range in temperature from substantially 260° F. to 310° F., with holding times of substantially five minutes to less than one second.

While the above description of the subject process has been made with specific reference to evaporated milk, the process is to be understood as being applicable to other milk products where age-thickening tendencies exist on storage after high-temperature, short-time sterilization. While specific examples of carrying out the process have been described in detail, it is to be understood that these are only illustrative, since the process is capable of modification to take care of different conditions and requirements. Such variations are contemplated as come within the spirit of the invention and the scope of the appended claims.

What is claimed is:

1. A method for producing a sterile evaporated milk with a minimum of cooked flavor and stabilized against age-thickening which comprises stabilizing the milk against heat coagulation by reducing the reactive divalent to monovalent ion ratio thereof, evaporating the milk to increase the solids ratio thereof to the desired degree, subjecting the evaporated milk to a temperature between 260° F. and 310° F. for a period of from five minutes to one second to sterilize said milk, cooling the sterilized evaporated milk, increasing the reactive divalent to monovalent ion ratio of the cooled evaporated milk to a value in excess of such ratio after said stabilization against heat coagulation by bringing said milk into reactive relationship with an ion-exchange material, thereby stabilizing the milk against age-thickgening, and sealing the milk in a container under sterile conditions.

2. The method of claim 1, in which said evaporated milk is sterilized by rapidly heating the same to a temperature of approximately 275° F. and holding the milk at said temperature for approximately one-half minute.

3. The method of claim 1, in which said milk is stabilized against heat coagulation by forewarming the same to an elevated temperature.

4. The method of claim 1 including the step of bringing said cooled evaporated milk into reactive relationship with ion-exchange material by providing such material in said container.

5. The method of claim 4 including the step of lining at least a portion of the interior of the container with said ion-exchange material.

6. A method for producing a sterile evaporated milk with a minimum of cooked flavor and stabilized against age-thickening which comprises stabilizing the milk against heat coagulation by reducing the reactive divalent to monovalent ion ratio thereof, evaporating the milk to increase the solids ratio thereof to the desired degree, heating the evaporated milk to a temperature between 260° F. and 310° F. for a period of from five minutes to one second to sterilize said milk, cooling the sterilized evaporated milk, increasing the reactive divalent to monovalent ion ratio of the cooled, sterilized evaporated milk to a value in excess of such ratio after said stabilization against heat coagulation, said increase in divalent ion ratio preventing the formation of objectionable crystals and stabilizing the milk against age-thickening, and sealing the milk in a container under sterile conditions.

7. The method of claim 6 in which said milk is stabilized against age-thickening by treating the same to increase the concentration therein of reactive calcium ions and decrease the concentration therein of monovalent alkaline metal ions.

8. A method for producing a sterile milk product stabilized against age-thickening which comprises sterilizing the product, increasing the reactive divalent to monovalent ion ratio of the sterilized product to a value in excess of such ratio prior to sterilization of the product, said increase in divalent ion ratio preventing the formation of objectionable crystals and stabilizing the product against age-thickening, and sealing the product in a container under sterile conditions.

9. The method of claim 8 in which said dairy product is milk and in which the product is sterilized by heating the same to a temperature in excess of 260° F. for a short period and then cooling the same prior to said stabilization against age-thickening.

10. The method of claim 8 in which the reactive divalent to monovalent ion ratio is increased by bringing the sterilized product into reactive relationship with an ion-exchange material.

11. A method for producing a sterile evaporated milk with a minimum of cooked flavor and stabilized against age-thickening which comprises stabilizing the milk against heat coagulation by reducing the reactive divalent to monovalent ion ratio thereof, evaporating the milk to increase the solids ratio thereof to the desired degree, sterilizing the milk, and then sealing the sterilized evaporated milk in a container under sterile conditions, said container having therein an ion-exchange material capable of increasing the reactive divalent calcium ion to monovalent alkaline metal ion ratio of the milk to a value in excess of such ratio after said stabilization against heat coagulation, thereby stabilizing the milk against age-thickening.

12. A method for producing a sterile milk product stabilized against age-thickening which comprises sterilizing the product and sealing the product in a container, said container having therein a material capable of increasing the divalent to monovalent ion ratio of the product to a value in exceess of such ratio prior to sterilization of the product.

13. A method for producing a sterile evaporated milk stabilized against age-thickening which comprises evaporating milk to increase the solids ratio thereof, heating the evaporated milk to high temperatures for a short time to sterilize the evaporated milk, cooling the sterilized milk, and then increasing the then existing divalent to monovalent ion ratio of the cooled, evaporated and sterilized milk, said increase in divalent ion ratio preventing the formation of objectionable crystals.

14. An aseptically canned sterile evaporated milk made by the process of claim 1.

15. An aseptically canned sterile evaporated milk made by the process of claim 6.

16. An aseptically canned sterile evaporated milk made by the process of claim 11.

17. An aseptically canned sterile milk product made by the process of claim 12.

References Cited in the file of this patent

UNITED STATES PATENTS

| | | |
|---|---|---|
| 2,064,110 | Hall | Dec. 15, 1936 |
| 2,087,962 | Ball | July 27, 1937 |
| 2,135,054 | Schwartz | Nov. 1, 1938 |
| 2,360,033 | Baumann | Oct. 10, 1944 |
| 2,374,427 | Fear | Apr. 24, 1945 |
| 2,503,866 | Chrysler et al. | Apr. 11, 1950 |
| 2,511,825 | Myers | June 13, 1950 |
| 2,570,231 | Hansen | Oct. 9, 1951 |
| 2,541,568 | Baur | Feb. 13, 1951 |